(12) United States Patent
Duczmal et al.

(10) Patent No.: US 7,146,567 B1
(45) Date of Patent: Dec. 5, 2006

(54) METHOD AND SYSTEM FOR DYNAMIC DISPLAY OF MARKETING CAMPAIGNS ON DISPLAY LOCATIONS VIA A NETWORK

(75) Inventors: Tomasz Duczmal, Oakville (CA); David M. Roscoe, Burlington (CA)

(73) Assignee: Adflow Networks Inc., Ontario (CA)

( * ) Notice: Subject to any disclaimer, the term of this patent is extended or adjusted under 35 U.S.C. 154(b) by 0 days.

(21) Appl. No.: 09/535,979

(22) Filed: Mar. 27, 2000

(30) Foreign Application Priority Data

Dec. 17, 1999  (CA) ................................. 2293556

(51) Int. Cl.
*G06F 3/00* (2006.01)

(52) U.S. Cl. ............... 715/736; 715/962; 715/963; 715/730; 715/732

(58) Field of Classification Search .......... 345/736, 345/962; 705/14, 52, 75, 7; 725/22, 35, 725/32, 42; 715/736, 962, 963, 730, 732
See application file for complete search history.

(56) References Cited

U.S. PATENT DOCUMENTS 6,009,409 A    12/1999  Adler et al.
6,182,050 B1 *  1/2001  Ballard ........................ 705/14
6,253,189 B1 *  6/2001  Feezell et al. ................ 705/14
6,285,985 B1 *  9/2001  Horstmann ................... 705/14
6,357,042 B1 *  3/2002  Srinivasan et al. ......... 725/119
6,430,605 B1 *  8/2002  Hunter ....................... 709/207
6,513,052 B1 *  1/2003  Binder ....................... 707/204

FOREIGN PATENT DOCUMENTS

WO          WO 97/41546         11/1997

* cited by examiner

*Primary Examiner*—Weilun Lo
*Assistant Examiner*—Mylinh Tran
(74) *Attorney, Agent, or Firm*—Staas & Halsey LLP (57) ABSTRACT

A method and system for dynamic display of marketing campaigns on display locations via a network. The system includes a database for storing advertising material, and display locations for displaying the advertising material. Further, the system includes a server for managing the advertising material provided to the display location, and a plurality of input sources connected with the server to provide scheduling information and the advertising material to the server for scheduling display of the advertising material on the display location.

11 Claims, 6 Drawing Sheets

METHOD AND SYSTEM FOR DYNAMIC DISPLAY OF MARKETING CAMPAIGNS ON DISPLAY LOCATIONS VIA A NETWORK

FIELD OF THE INVENTION

The present invention relates in general to displaying advertising material and more specifically to a method and system for dynamic display of marketing campaigns on display locations via a network.

BACKGROUND OF THE INVENTION

In today's economy, advertising and promotions play a significant role in marketing campaigns. Traditionally, one of the ways to deliver promotional messages has been via use of billboards and posters located in public places. This requires a long and inefficient process, involving graphic designers, printing houses, advertising agencies and billboard owners.

Since the life cycle of many products is quite short, a quick method of delivering advertising material is required. In the past, advertisers spent six or more months for advertising campaigns. Such lead times are becoming less and less feasible. The effectiveness of marketing tools depends heavily on timing, graphical form and attractiveness of the message presented. Consumers now expect dynamic multimedia displays as seen on the Internet and graphic designers want to express themselves in a new ways. In contrast, prior art billboard and poster displays are generally static where one site is occupied by the same material for a long duration of time. Also, the content displayed on the billboards and posters is difficult to change.

Marketing has become a complicated international business process requiring many interactions between many global participants. The logistics of putting new content on or updating the billboards, for example in response to market fluctuations, is complicated and involves several parties, which raises the cost and extends the time from conception to actual display of the poster (i.e. a new printed poster to be installed over the old one). Furthermore, only one advertiser can use each billboard location at any given time. Finally, marketing campaign designers are forced to deal with many billboard operators with different business practices and requirements. This slows down delivery of campaign content and limits the flexibility in delivery method.

In recent years, an unprecedented growth in the economy has been experienced. An undisputed factor in this growth is the role of the Internet which enables business to be performed over the Internet. This includes broadcasting information about available products and services, taking orders for goods and enabling flow of information between business participants.

Advertising has also become prevalent on the Internet as exemplified by U.S. Pat. No. 6,009,409 to Adler et al. and International patent application NO WO97/41546 to Hylin et al. U.S. Pat. No. 6,009,409 is directed at a system for controlling timing and form of advertisements sent to users who are actively browsing the Internet. WO 97/41546 describes a system which focuses on the control of displays over private local area networks with limited telephone access.

In both of these prior art systems, advertising material is shown to the user without the user's consent. The advertiser takes advantage of the fact that a user is browsing a screen and places their advertising in an available space. Also, both systems are susceptible to unauthorized access since the owner of the display has no control over the advertising material.

In order to overcome the limitations of the prior art, there is provided a method and system for scheduling the dynamic display of marketing campaigns via a network.

SUMMARY OF THE INVENTION

The present invention provides a method and system for dynamic display of marketing campaigns via a network. The system comprises a central server which contains information concerning display locations as well as available time slots. An advertiser accesses the central server to select a time slot for a specific display location and then uploads the advertising material to the central server. Prior to the occurrence of the allotted time slot, the advertising material is uploaded to the display location and displayed at when the time slot occurs.

Integrity checks are performed on the advertising material to ensure that the material is displayable.

The advertiser is also allowed to monitor the content being displayed so that the advertiser can see the advertising material allocated to a display location and time slot.

The display locations are computerized devices with a processor and an ability to communicate with the server. The basic functionality of the display location is to display advertising material, in the form of a valid image object, during the allocated time slot. Prior to expiry of validity of an image object allocated to a current time slot, the display location triggers a communication session with the server to upload the next valid object to be displayed.

Also, the present invention allows advertisers in a marketing campaign to access the server via the Internet. Since all information relating to advertising material (image objects), time slots and display locations flows through the server, the server aids in standardizing the method of doing business for advertisers. The server stores image objects, uploaded by the advertiser, in a central database to be downloaded to display locations when requested by the display location.

According to an aspect of the present invention, there is provided a system for dynamic display of marketing campaigns on display locations via a network comprising:

a database for storing advertising material;

at least one display location for displaying said advertising material;

a server for managing said advertising material provided to said at least one display location; and a plurality of input sources for providing scheduling information and said advertising material to said server for scheduling said display of said advertising material on said at least one display location.

According to another aspect of the present invention, there is provided a method for dynamically displaying marketing campaigns on display locations via a network comprising the steps of:

accessing a server, via said network, to retrieve available time slots associated with at least one display location;

selecting a time slot from said available time slots for displaying advertising material;

storing said advertising material in a database;

uploading said advertising material to said display location prior to occurrence of said selected time slot; and displaying said advertising material at said display location when said time slot occurs.

According to yet another aspect of the present invention there is provided A computerized billboard comprising:
a display device;
a communicator;
an objects storage; and
a processor;
wherein said processor comprises:
operating system software;
display software;
communication software;
object manager software; and
FTP/VPN transfer software.

BRIEF DESCRIPTION OF THE DETAILED DRAWINGS

An embodiment of the present invention will now be described more fully with reference to the accompanying drawings in which.

GENERAL DESCRIPTION OF THE PREFERRED EMBODIMENT

Figure 1:
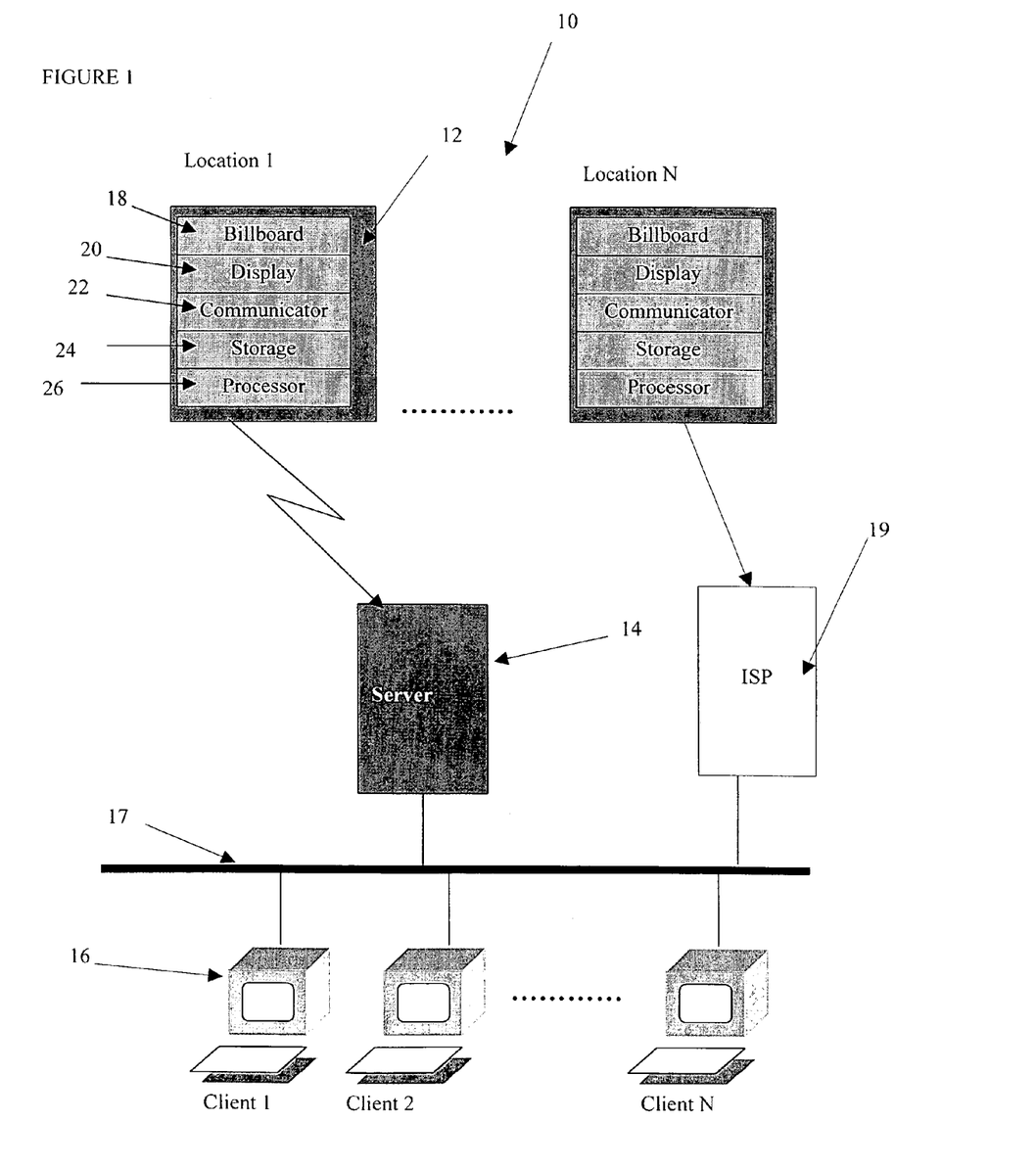
FIG. 1 is a schematic diagram of the system of the present invention.

A schematic diagram of the information system for providing effective collaboration between marketing campaigns participants and secure delivery of advertising material to a display location is shown in FIG. 1. The system 10 comprises a plurality of display locations 12 connected to a central server 14 which, in turn, is connected to a plurality of input sources 16 via the Internet 17. In the preferred embodiment, the input sources are personal computers.

Each display location 12 generally comprises at least one computerized device, preferably a computerized billboard, 18, a display device 20, a communicator 22, an objects storage 24 and a processor 26. The objects storage 24 is preferably non-volatile memory. The billboard 18 is a stationary space used to display advertising material via the display device 20 which may be a computer video display such as an LCD panel, an LED panel, a projecting device utilizing digital light processing device or a cathode ray tube (CRT). The processor 26 controls logic and events sequence of the billboard 18 and display device 20 of the display location 12. Communication between each display location 12 and the server 14 is achieved via the communicator 22. In the preferred embodiment, the communicator is a modem. The display location 12 may also be connected to the server 14 through an Internet Service Provider 19 via a virtual private network session.

Figure 2:
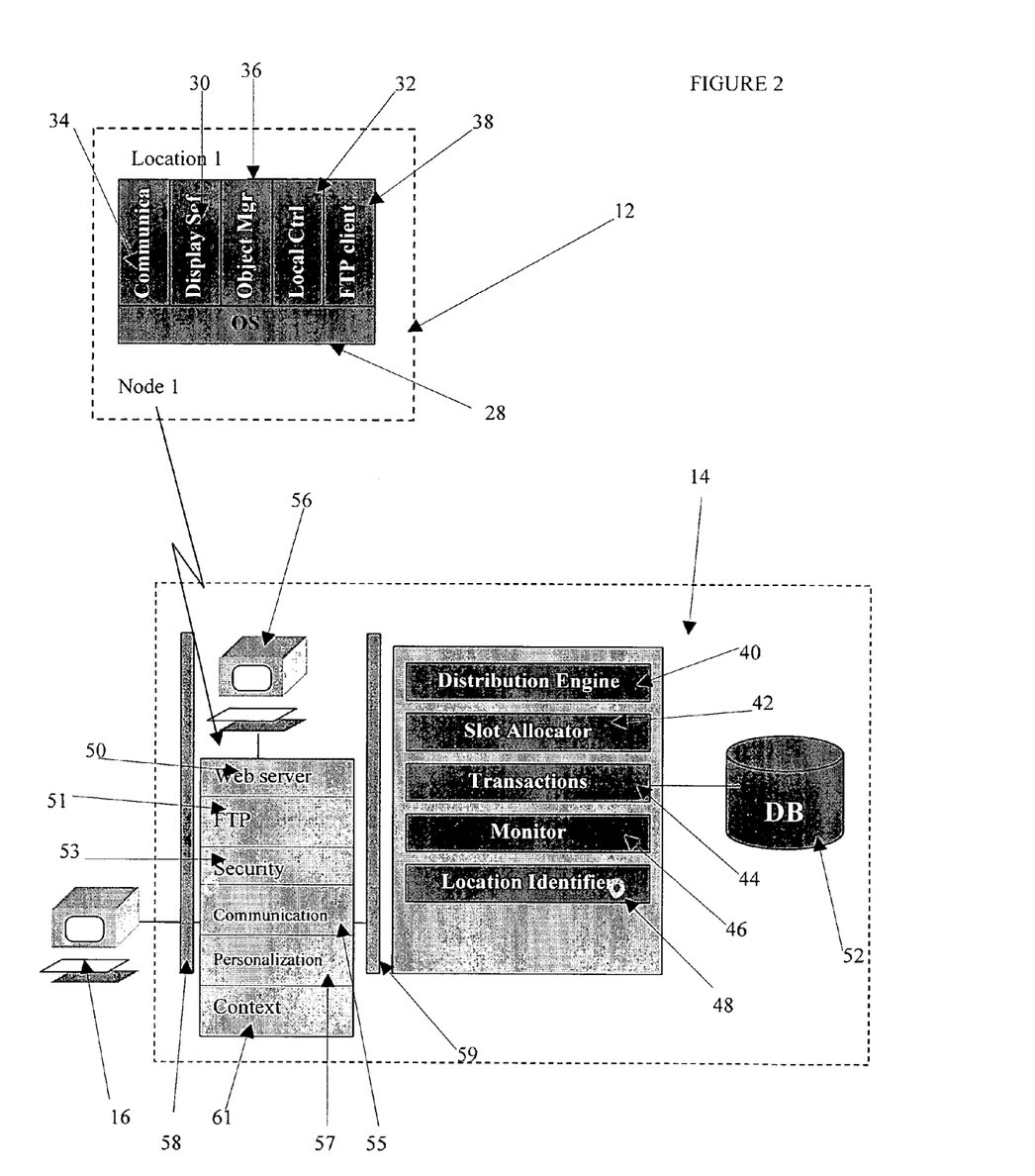
FIG. 2 is a more detailed schematic diagram of the system of the present invention.

Turning to FIG. 2, a more detailed schematic of the software modules of the processor 26 and the server 14 is provided. The processor 26 comprises operating system software 28 which executes display software 30, local controller software 32, communication software 34, object manager software 36 and FTP/VPN transfer software 38. The operating system software 28 provides support to the billboard 18 based on micro-kernal technology with message passing. The display software 30 enables decoding, decompression and display of images, animations and video on the display device 20. The local controller software 32 checks validity of the advertising material (in the form of at least one image object) and sends the material to the display software 30. The validity checks and displays progress through subsequent time slots up to the end of a display cycle and re-starts. The validity check relates to expiration date and time. If the expiration time of an image object allocated to the current time slot is shorter than a predefined time window, the local controlled software 32 sends a signal to the object manager 36. The object manager software 36 triggers communication module 34 to establish a communication channel with the server 14. Finally, the FTP client software 38 executes FTP software once the communication channel is created. The FTP software assists in the downloading of information, including the image object for the following time slot, from the server 14. This results in the display of a new image object when the subsequent time slot arrives in the next display cycle.

The server 14 comprises a distribution engine 40, a slot allocator 42, a transaction system 44, a monitoring system 46, a location identifier 48 and a central database 52. Application engines stored on a web server 50 are accessed by an administrator, via an administrative computer 56, or by an advertiser, via one of the input sources 16. The server 14 and the application engines provide business logic which enable interaction of many advertisers with many consumers. The server 14 is separated from the Internet by a corporate firewall 59. The corporate firewall 59 is configured such that only certain objects may pass through to the server 14 from the Internet 17.

The distribution engine 40 uploads image objects from the input sources 16 and checks the objects for technical integrity before storing them in the central database 52 along with scheduling and display location information. The slot allocator 42 maintains and tracks available time slots at display locations 12. The transaction system 44 enables payments, cancellations and tracks orders and invoice status. The monitoring system 46 allows for real-time viewing, on an input source 16, the content being displayed on the billboard 18 at the display location 12. The location identifier 48 allows advertisers to search the central database 52 for description, statistical and technical information on each display location 12. The central database 52 also stores data for use by the distribution engine 40, the slot allocator 42, the transaction system 44 and the monitoring system 46.

Several services are located between the corporate firewall 59 and a main firewall 58. These services secure the connection between the input source 16 and the server 14. The services includes the web server 50, an FTP/VPN server 51, a security module 53, a communications module 55, a personalization module 57 and a context service module 61.

The web server 50 passes html pages dynamically created by the server 14 when requested by an input source 16. The FTP/VPN server 51 opens, closes and maintains file transfer channels between the input sources 16 and the server 14. Security module 53 maintains and verifies user profiles, names, roles, passwords, server access privileges and history logs of actions performed by the input source 16. Communication module 55 enables dial in by display locations and translates file types from the processor 26 to the server 14. Personalization module 57 maintains user profile data and creates html pages with a personalized look for the advertiser during the login session. Context module 61 tracks the history of past login sessions and returns an html page reflecting the stage of a business process from a previous login. Administrative functions for these modules are performed by a system administrator via the administration computer 56.

Figure 3:
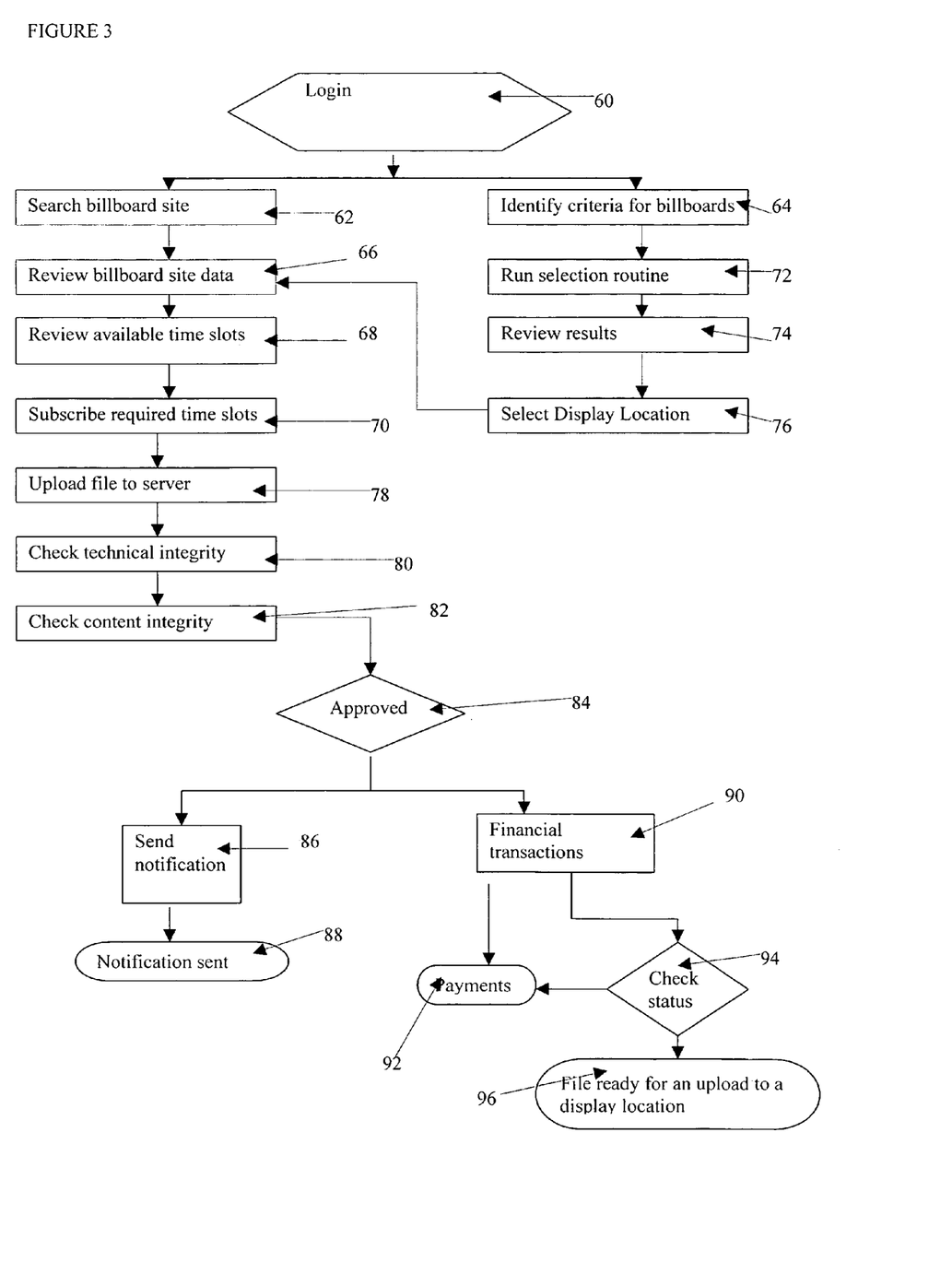
FIGS. 3–6 are flowcharts detailing work flow processes according to the preferred embodiment.
Figure 4:
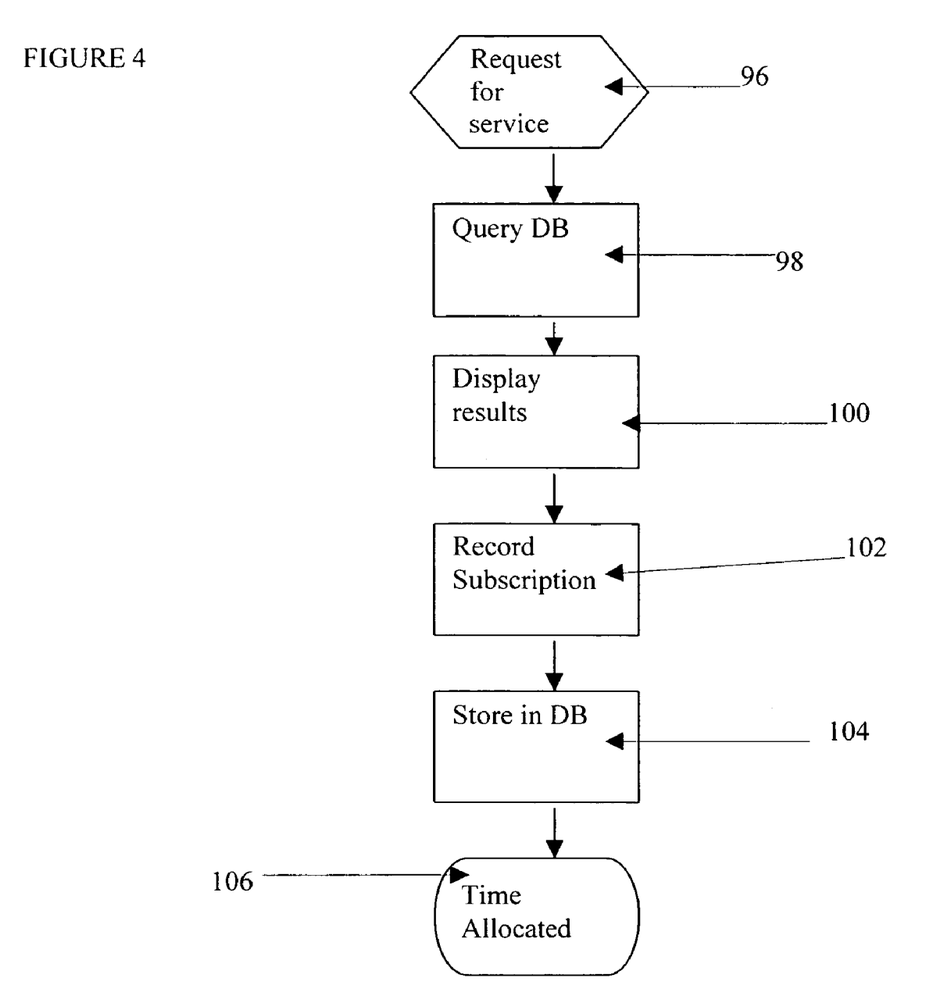

Turning to FIGS. 3–6, flowcharts outlining various aspects of the present invention are provided. Firstly, an advertiser accesses the server 14 via one of the input sources 16. After logging in (step 60), the advertiser can either search a specific display location 12 (step 62) or submit pre-requisite criteria for a display location 12 (step 64). If the advertiser decides to search a specific display location 12, the advertiser then reviews data corresponding to the display location 12 (step 66). This data may include address of physical location, size, display specification of the billboard, traffic data at the location, and demographic data related to the geographical location. After reviewing the data, the advertiser reviews the available time slots, provided by the slot allocator 42, (step 68) and then subscribes to an available time slot to display the advertisement (step 70). A flowchart outlining the operation of the slot allocator 42 is shown in FIG. 4. Alternatively, if the advertiser decides to submit criteria for a display location 12 (step 64), the advertiser then proceeds to execute a selection routine (step 72). This allows an advertiser to select a display location 12 based on pre-requisite criteria such as volume of traffic at the location and time slots available at the display location. After the selection routine has been executed, the advertiser reviews the results (step 74) and selects a display location 12 (step 76). The advertiser then reviews the display location data (step 66), reviews available time slots (step 68) and subscribes to a time slot (step 70).

After subscribing to a time slot, the advertiser uploads the advertising material to the server 14 (step 78).

Once the advertising material is uploaded to the server 14, the distribution engine 40 reviews the information for technical integrity (step 80). After checking for technical integrity, the advertising material is reviewed for content integrity by the administrator (step 82). If the advertising material does not pass the content integrity test, the advertiser is informed and is requested to amend the advertising material. Otherwise, the advertising material is approved and stored in the central database 52 (step 84). The advertiser is then notified that the advertising material has been stored (step 86). While the notification is being sent (step 88), a financial transaction is executed (step 90). The financial transaction may either be payment for the selected time slot (step 92) or a check of the time remaining for a previously purchased time slot (step 94). Upon confirmation of payment, the image object is ready to be uploaded to the display location 12 (step 96). The image object must be uploaded to the display location 12 prior to the expiry of the previous time slot.

Turning to FIG. 4, when an advertiser requests time slot information (step 96), the central database 52 is queried (step 98). The available time slots are then displayed on the input source 16 (step 100). After the advertiser subscribes to a time slot (step 102), the database 52 is updated with the new subscription (step 104) and the time slot is deemed allocated (step 106).

Figure 5:
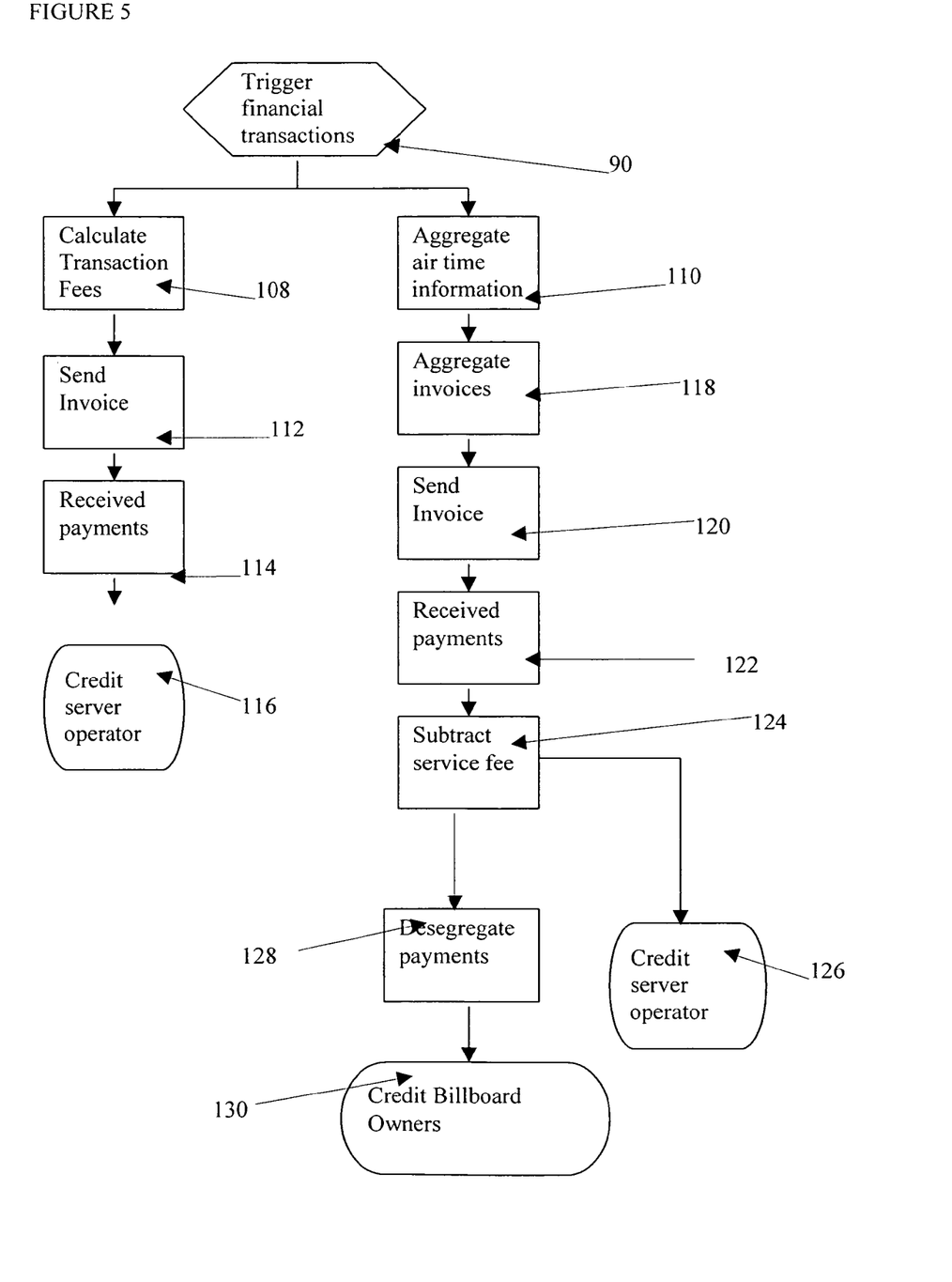

Turning to FIG. 5, a flowchart outlining financial transactions is shown. When the advertiser executes a financial transaction (step 90), the transaction module 44 performs two functions. The transaction module 44 calculates transaction fees (step 108) and aggregates air time information (step 110) where more than one time slot on more than one display location has been subscribed to by a single advertiser.

After the transaction module 44 calculates transaction fees (step 108), an invoice is then sent to the advertiser electronically or by regular air mail (step 112). After payment is received (step 114), credit is applied to the server operator (step 116).

In parallel, the transaction module 44 aggregates air time information (step 110), invoices are then aggregated (step 118). An invoice is then sent (step 120) and once payment is received (step 122), a service fee is subtracted (step 124). The server operator is credited (step 126) and the payment is desegregated to different display location owners (step 128). The display location owners are then credited (step 130).

Figure 6:
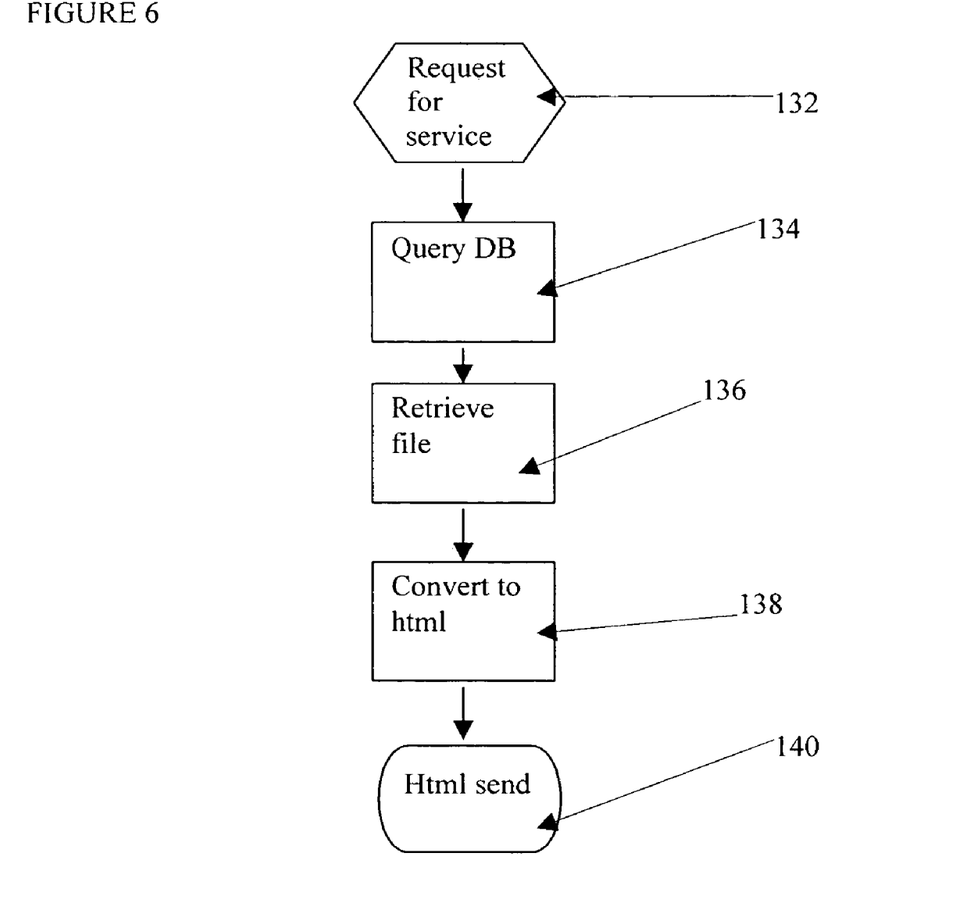

It may be also possible for advertisers to monitor their advertising material at the display location 12 via one of the input sources 16, as shown in FIG. 6. After monitoring is requested (step 132), the central database 52 is queried (step 134). The advertising material is then retrieved from the central database 52 (step 136), converted to an html file (step 138) and forwarded to the advertiser (step 140).

It will be appreciated that, although only one embodiment of the invention has been described and illustrated in detail, various changes and modification may be made. One such modification is that communication between the input sources 16 and the server 14 and the server 14 and the display location 12 may be via any type of network and does not have to restricted to the Internet. For example, a cellular network or even a radio network. All such changes and modifications may be made without departing from the spirit and scope of the invention as defined by the claims appended herein.

What is claimed is:

1. A system for dynamic display of advertising material, comprising:
   a plurality of input sources for receiving scheduling information and advertising material in the form of at least one image object for scheduling display of said advertising material during an allocated time slot;
   a database for storing said at least one image object;
   a server for managing said advertising material in accordance with said scheduling information; and
   at least one billboard located in a public space accessible by the public for displaying to the public said at least one image object during said allocated time slot and, prior to expiry of said allocated time slot, triggering a communication session with said server where the server is responsive to a request initiated by said billboard and without requiring the billboard to continuously listen for a request from the server to upload and display a further image object during a respective further time slot which results in a secure communication with the server, wherein said billboard is visible to the server only upon said triggering of the communication session.

2. The system of claim 1 wherein said server comprises:
   a distribution engine for uploading said scheduling information and said advertising material from said plurality of input sources, for managing said advertising material and for providing said advertising material to said at least one display location; and
   a slot allocator for monitoring said scheduling of said display.

3. The system of claim 2 wherein said server further comprises:
   a transaction system for enabling payment, cancellations and status checking.

4. The system of claim 3 wherein said server further comprises:
   a location identifier for providing description, statistical and technical information concerning said at least one display location to at least one of said plurality of input sources.

5. The system of claim 1 wherein said server further comprises a monitoring system for providing a view of said advertising material, allocated to a display location, to at least one of said plurality of input sources.

6. A method for dynamic display of advertising, comprising:
   accessing a server, via said network, to retrieve available time slots associated with at least one billboard;
   selecting a time slot from said available time slots for displaying advertising material;
   storing said advertising material in a database;
   uploading said advertising material from said database to said billboard prior to occurrence of said selected time slot;
   displaying said advertising material to the public at said billboard located in a public space accessible by the public when said timeslot occurs; and
   initiating from said billboard a communication session with said server where the server is responsive to a request initiated by the billboard and without requiring the billboard to continuously listen for a request from the server for uploading further advertising material from said database to said billboard upon expiry of said timeslot for further display at said billboard during a respective further time slot which results in a secure communication with the server, where said billboard is visible to the server only upon said initiating of the communication session.

7. The method of claim 6, further comprising:
   searching for a billboard before selecting a time slot from said available time slots.

8. The method of claim 7, further comprising:
   retrieving billboard location data after searching for a billboard location.

9. The method of claim 6, further comprising:
   checking said advertising material for technical integrity before storing said advertising material in the database.

10. The method of claim 6, further comprising:
    performing financial transactions before said uploading of said advertising material.

11. The method of claim 10, wherein of the operation of performing financial transactions includes calculating transaction fees and aggregating air time information.

* * * * *